United States Patent
Nomizu et al.

(10) Patent No.: US 7,526,133 B2
(45) Date of Patent: Apr. 28, 2009

(54) IMAGE PROCESSING APPARATUS, IMAGE PROCESSING PROGRAM, AND STORAGE MEDIUM

(75) Inventors: Yasuyuki Nomizu, Kanagawa (JP); Hiroyuki Sakuyama, Tokyo (JP); Junichi Hara, Kanagawa (JP); Nekka Matsuura, Kanagawa (JP); Takanori Yano, Kanagawa (JP); Taku Kodama, Kanagawa (JP); Toshio Miyazawa, Kanagawa (JP); Yasuyuki Shinkai, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 937 days.

(21) Appl. No.: 10/754,684

(22) Filed: Jan. 9, 2004

(65) Prior Publication Data

US 2004/0190782 A1 Sep. 30, 2004

(30) Foreign Application Priority Data

Jan. 9, 2003 (JP) ............................. 2003-003012

(51) Int. Cl.
*G06K 9/36* (2006.01)
(52) U.S. Cl. .................. 382/232; 358/1.15; 375/240.11
(58) Field of Classification Search ................. 382/132, 382/284, 1.15, 232
See application file for complete search history.

(56) References Cited

U.S. PATENT DOCUMENTS

| | | | | |
|---|---|---|---|---|
| 5,617,517 A * | 4/1997 | Chi | ........................... | 358/1.15 |
| 5,719,686 A | 2/1998 | Sakamoto et al. | | |
| 5,757,965 A * | 5/1998 | Ohki | ........................... | 382/232 |
| 6,198,848 B1 * | 3/2001 | Honma et al. | ................. | 382/232 |
| 6,259,826 B1 * | 7/2001 | Pollard et al. | ................. | 382/284 |
| 6,711,295 B2 * | 3/2004 | Nakayama et al. | ........... | 382/232 |
| 7,079,690 B2 * | 7/2006 | Boliek et al. | ................. | 382/232 |
| 7,127,111 B2 * | 10/2006 | Fukuhara et al. | ............. | 382/232 |
| 2004/0165785 A1 | 8/2004 | Monobe | | |

FOREIGN PATENT DOCUMENTS

| | | |
|---|---|---|
| JP | H07-203226 | 8/1995 |
| JP | 2814970 | 6/1997 |
| JP | 10-051642 | 2/1998 |
| JP | H10-178528 | 6/1998 |
| JP | 11-041503 | 2/1999 |
| JP | 11-088700 | 3/1999 |
| JP | 11-136521 | 5/1999 |

(Continued)

OTHER PUBLICATIONS

Japanese Office Action for JP2003-003012, Issue date Oct. 30, 2007 (2 pages).

(Continued)

*Primary Examiner*—Brian Q Le
*Assistant Examiner*—Aklilu K Woldemariam
(74) *Attorney, Agent, or Firm*—Blakely, Sokoloff, Taylor & Zafman LLP

(57) ABSTRACT

An image processing apparatus comprises a compression coding unit that performs compression coding of image data according to JPEG2000 algorithm. A coding style selection unit selectively activates coding functions of the compression coding unit in response to a discriminating signal, so that the active coding functions of the compression coding unit are suited to characteristics of the image data.

13 Claims, 16 Drawing Sheets

FOREIGN PATENT DOCUMENTS

| | | |
|---|---|---|
| JP | 2000-222564 | 8/2000 |
| JP | 2001-061146 | 3/2001 |
| JP | 2001-251623 | 9/2001 |
| JP | 2002-194417 | 7/2002 |
| JP | 2002-247375 | 8/2002 |
| JP | 2003-023544 | 1/2003 |
| WO | WO 02/093935 | 11/2002 |

OTHER PUBLICATIONS

Japanese Office Action JP 2003-003012, issued Feb. 5, 2008 (2 pages).

* cited by examiner

DECOMPOSITION LEVEL-0

DECOMPOSITION LEVEL-1

DECOMPOSITION LEVEL-2

DECOMPOSITION LEVEL-3

END OF CODESTREAM

FIG.11

| IMAGES | DC LEVEL SHIFTING | COLOR TRANSFORM | DWT | QUANTIZE | COEFFI. BIT MODEL | ARITHMETIC CODING | DATA ORDERING |
|---|---|---|---|---|---|---|---|
| NATURAL IMAGE | ○ | ○ | ○ | ○ | ○ | ○ | ○ |
| CG IMAGE | × | × | × | △ | ○ | ○ | ○ |
| PALETTIZED IMAGE | × | × | × | × | ○ | ○ | ○ |
| MONOCHROME IMAGE | ○ | × | ○ | ○ | ○ | ○ | ○ |
| BI-LEVEL IMAGE | × | × | × | × | ○ | ○ | ○ |

123

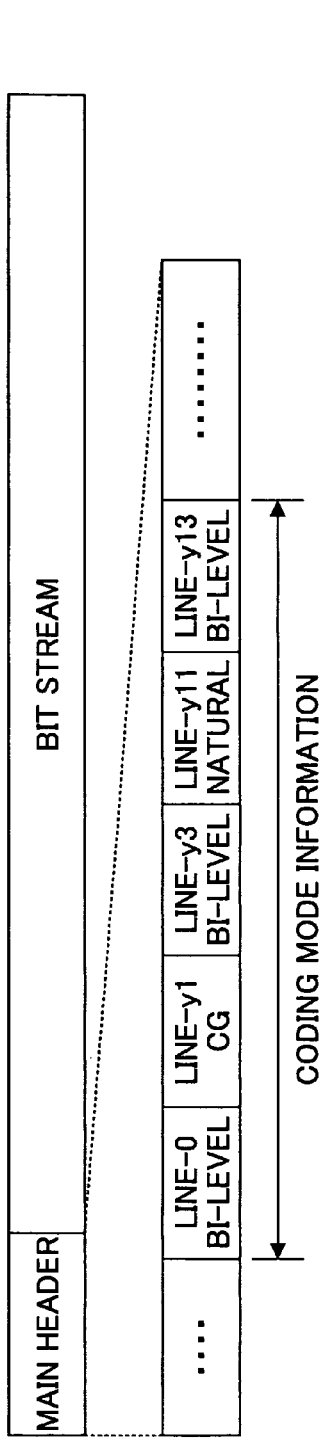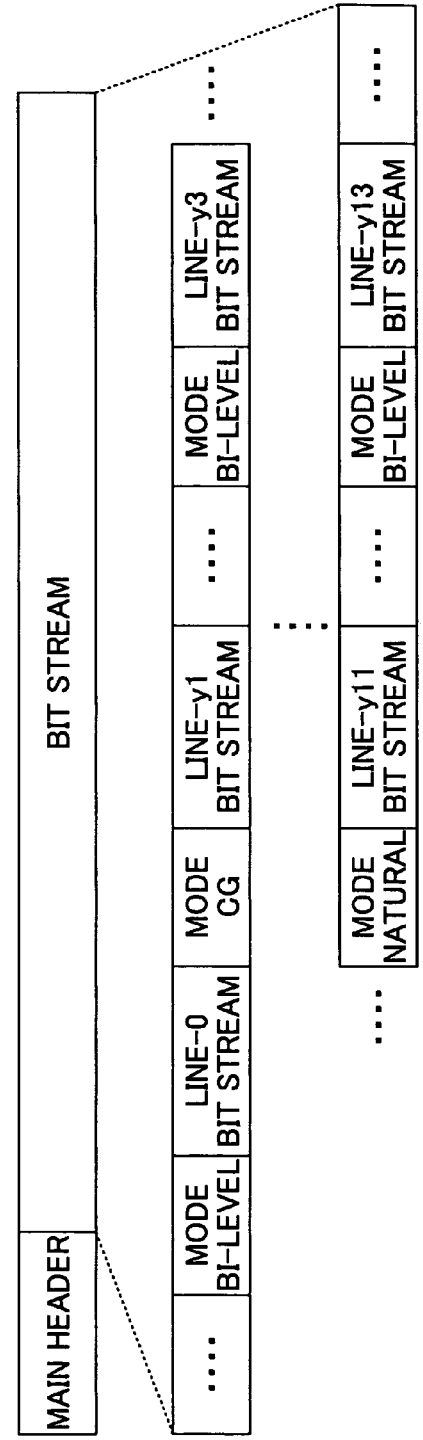

IMAGE PROCESSING APPARATUS, IMAGE PROCESSING PROGRAM, AND STORAGE MEDIUM

The present application claims priority to the corresponding Japanese Application No. 2003-003012, filed on Jan. 9, 2003, the entire contents of which are hereby incorporated by reference.

BACKGROUND OF THE INVENTION

1. Field of the Invention

The present invention relates to an image processing apparatus, such as a personal computer, which performs compression coding of image data according to JPEG2000 algorithm, and also relates to an image processing method which performs compression coding of image data according to JPEG2000 algorithm, and a storage medium storing a program embodied therein for causing a computer to execute the image processing method.

2. Description of the Related Art

With the recent development of computer networking, the spreading speed of Internet systems including personal computers is actually accelerated.

In such situations, the server, which distributes contents to the servers as the distribution source, handles various images when creating the contents. Namely, the various images handled by the server include a natural image like a photograph which is taken with a digital camera or inputted from a scanner, a computer graphics image (CG image) which is artificially created by a computer, a bi-level image like a usual document, a palletized text-picture image (or palletized color image) expressed in the pallet color according to the pallet color method, and a monochrome image. There may also be many cases in which these various images are complexly included in a document.

For example, in a case of a CG image, when compared with a natural image like a photograph image, it has the characteristics that the pixels of the same color may be continuous and the colors between the neighboring pixels are different extremely. Moreover, as for the color images, there is the characteristic that a natural image with each color of RGB for 8 bits, being inputted from a digital camera, and a palletized text-picture image, using the pallet color have a different composition of the image data.

On the other hand, it is essential that the server handles various images and carries out the compression coding and storing of the images, in order to make it possible to save the memory space and lessen the data capacity enabling the high-speed transmission of the image data during the contents distribution.

Conventionally, it is known that one of the compression coding of bi-level images and the compression coding of multi-level images is selected by switching when performing the compression coding processing mentioned above.

For example, Japanese Patent No. 2814970 (which corresponds to Japanese Laid-Open Patent Application No. 09-150556) discloses an image processing method in which two different encoders are provided, an image is partially compressed by using one of the encoders, the type of the image is determined from the compression ratio of the compressed image, and the final compression method is selected according to the image type.

Moreover, the image compression technology of JPEG2000 algorithm attracts the attention as the technology of high compressibility image encoding/decoding in which the encoded image can be restored with high quality of image.

Although the image processing method of Japanese Patent No. 2814970 can carry out the image compression processing selectively depending on the image type (or on whether the image is a bi-level image or a multi-level image), the plural encoders for compression encoding of the different image types must be provided. Such image compression processing is not efficient, and the composition of the whole image processing apparatus will become complicated and the cost will be raised because of the use of the plural encoders. Moreover, the image types for which the compression coding is possible will be limited to the bi-level image or the multi-level image.

Moreover, when JPEG2000 algorithm is used, some processings for efficient compression encoding are included and it is basically efficient and high compressibility can be attained. However, such processings are not necessarily effective for the characteristics of some image types. On the contrary, there is the case in which the encoding efficiency becomes poor because of the use of such processings.

SUMMARY OF THE INVENTION

An image processing apparatus, image processing program, and storage medium are described. In one embodiment, the image processing apparatus comprises a compression coding unit to perform compression coding of image data according to JPEG2000 algorithm; and a coding style selection unit to selectively activate coding functions of the compression coding unit in response to a discriminating signal, to cause the active coding functions of the compression coding unit to be suited to characteristics of the image data.

BRIEF DESCRIPTION OF THE DRAWINGS

Other embodiments, features and advantages of the present invention will be apparent from the following detailed description when read in conjunction with the accompanying drawings.

FIG. 11 is a diagram illustrating a coding style table used by the image processing apparatus of the present embodiment.

FIG. 17 is a diagram illustrating an example of the codestream created by a rasterline-based coding-style processing of the image processing apparatus of the invention.

FIG. 18 is a diagram illustrating another example of the codestream created by the rasterline-based coding-style processing of the image processing apparatus of the invention.

DETAILED DESCRIPTION OF PREFERRED EMBODIMENTS

Figure 1:
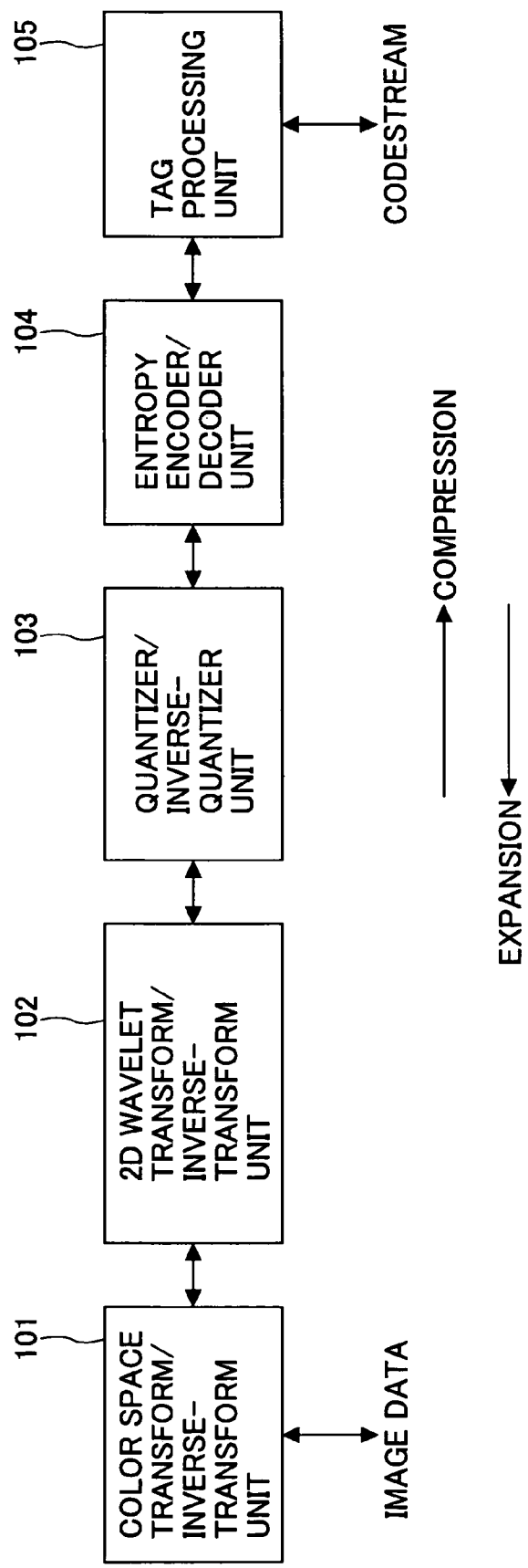
FIG. 1 is a block diagram of a baseline image processing system that utilizes the hierarchical coding algorithm that is the fundamental function of the JPEG2000 algorithm.

An embodiment of the present invention comprises an improved image processing apparatus in which the above-described problems are eliminated.

Other embodiments of the present invention comprise an image processing apparatus, image processing method, and storage medium which utilizes the image compression technology of JPEG2000 algorithm, and carries out the compression coding of the images having various characteristics by using a single encoder with high coding efficiency without causing the problems of JPEG2000 algorithm.

An embodiment of the present invention includes an image processing apparatus comprising: a compression coding unit to perform compression coding of image data according to JPEG2000 algorithm; and a coding style selection unit to selectively activate coding functions of the compression coding unit in response to a discriminating signal to cause the active coding functions of the compression coding unit to be suited to characteristics of the image data.

An embodiment of the present invention includes an image processing apparatus comprising: a compression coding unit to perform compression coding of image data according to JPEG2000 algorithm; a coding style selection unit to selectively activate coding functions of the compression coding unit; a coding efficiency unit to cause the compression coding unit to perform a plurality of coding style modes of compression coding processing of the image data in which the selective activation of the coding functions by the coding style selection unit differs each other, and computing a coding efficiency of each of a set of codestreams obtained through the different coding style processings respectively; and a selection unit to select one of the respective codestreams with a highest coding efficiency among the computed coding efficiencies as being an output codestream actually outputted from the compression coding unit.

An embodiment of the present invention includes an image processing apparatus comprising: a compression coding unit to perform compression coding of image data according to JPEG2000 algorithm; a coding style selection unit to selectively activate coding functions of the compression coding unit; a coding efficiency unit to cause the compression coding unit to perform a plurality of coding style modes of compression coding processing of the image data in which the selective activation of the coding functions by the coding style selection unit differs each other, and computing a coding efficiency of each of a set of codestreams obtained through the different coding style processings respectively; a display unit to display the computed coding efficiencies of the respective codestreams on a display monitor for user selection of a desired coding style processing for the image data; and a selection unit to select one of the respective codestreams in response to a user choice as being an output codestream actually outputted from the compression coding unit.

An embodiment of the present invention includes an image processing method comprising: performing compression coding of image data according to JPEG2000 algorithm; and selectively activating coding functions of the compression coding in response to a discriminating signal, so that the active coding functions of the compression coding are suited to characteristics of the image data.

An embodiment of the present invention includes a storage medium storing a program embodied therein for causing a computer to execute an image processing method, the image processing method comprising: performing compression coding of image data according to JPEG2000 algorithm; and selectively activating coding functions of the compression coding in response to a discriminating signal, so that the active coding functions of the compression coding are suited to characteristics of the image data.

An embodiment of the present invention includes a storage medium storing a program embodied therein for causing a computer to execute an image processing method, the image processing method comprising: performing compression coding of image data according to JPEG2000 algorithm; selectively activating coding functions of the compression coding; performing a plurality of coding style modes of compression coding processing of the image data in which the selective activation of the coding functions differs each other; computing a coding efficiency of each of a set of codestreams obtained through the different coding style processings respectively; and selecting one of the respective codestreams with a highest coding efficiency among the computed coding efficiencies as being an output codestream created by the compression coding of the image data.

An embodiment of the present invention includes a storage medium storing a program embodied therein for causing a computer to execute an image processing method, the image processing method comprising: performing compression coding of image data according to JPEG2000 algorithm; selectively activating coding functions of the compression coding unit; performing a plurality of coding style modes of compression coding processing of the image data in which the selective activation of the coding functions differs each other; computing a coding efficiency of each of a set of codestreams obtained through the different coding style processings respectively; displaying the computed coding efficiencies of the respective codestreams on a display monitor for user selection of a desired coding style processing for the image data; and selecting one of the respective codestreams in response to a user choice as being an output codestream created by the compression coding of the image data.

According to embodiments of the image processing apparatus, image processing method and storage medium of the present invention, it is possible to easily and efficiently carry out the compression encoding of image data having various characteristics according to JPEG2000 algorithm with a single encoder. By using the coding style selection unit that selects the coding functions of the compression coding unit used, based on the characteristics of the image data, it is possible that the compression coding processing is made suitable for the characteristics of individual image data. Thus, it is possible for embodiments of the present invention to avoid the problems of JPEG2000 algorithm.

For the sake of providing good understanding of the subject matter of the invention, a description will be given of the outline of the hierarchical coding algorithm and the JPEG2000 algorithm, prior to the description of the preferred embodiments of the invention.

FIG. 1 shows a baseline image processing system that utilizes the hierarchical coding algorithm that contains the fundamental coding functions according to JPEG2000 algorithm.

The image processing system of FIG. 1 comprises a set of function blocks which include a color-space transform (or inverse transform) unit 101, a 2-dimensional wavelet transform (or inverse transform) unit 102, a quantization (or inverse quantization) unit 103, an entropy coding (or decoding) unit 104, and a tag processing unit 105.

In the case of a conventional JPEG algorithm, the discrete cosine transform (DCT) is used. In the case of the system of FIG. 1, the discrete wavelet transform (DWT) is used as the hierarchical coding algorithm by the 2-dimensional wavelet transform (or inverse-transform) unit 102.

Compared with the DCT, the DWT has the advantage that the quality of image in high compression ranges is high. This is because the JPEG2000 algorithm, which is the succeeding algorithm of JPEG, has adopted the DWT.

Moreover, with the hierarchical coding algorithm, another difference is that the system of FIG. 1 is provided with the tag processing unit 105 as an additional function block, in order to perform tag (headers, SOC, EOC) formation and codestream formation at the last stage of the system.

In the tag processing unit 105, at the time of image compression operation, compressed image data are generated as a codestream, and the interpretation of the codestream required for image expansion is performed at the time of image expansion operation.

Figure 3:
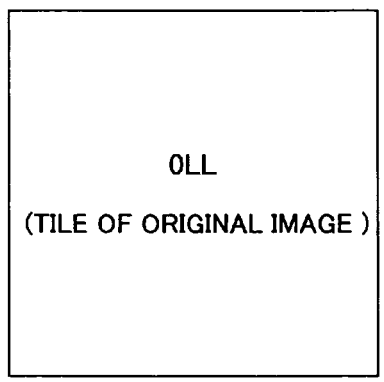
FIG. 3 is a diagram illustrating the hierarchical coding algorithm and the JPEG2000 algorithm.
Figure 3:
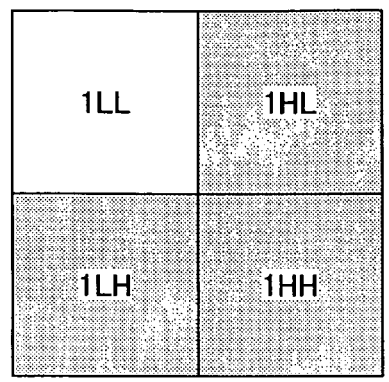
Figure 3:
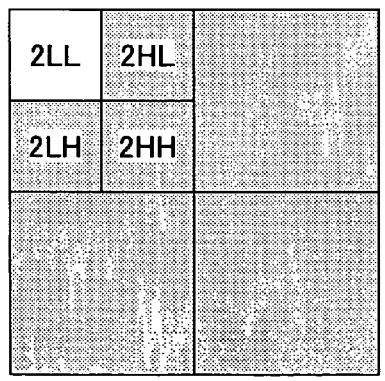
Figure 3:
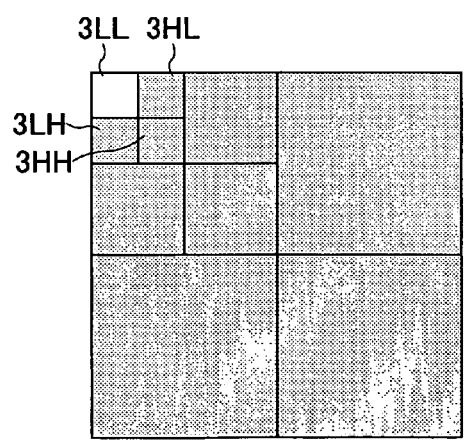

The JPEG2000 algorithm provides various convenient functions with the codestream. For example, as shown in FIG. 3, compression/expansion operation of the still image can be freely stopped at an arbitrary stage (decomposition level) corresponding to the octave division in the DWT in the block base.

The color-space transform (or inverse-transform) unit 101 is connected to the I/O part of the original image in many cases.

The color-space transform unit 101 is equivalent to, for example, the part which performs the color-space conversion to the RGB calorimetric system which includes each component of R(red)/G(green)/B(blue) of the primary-colors system, or the YUV or YCbCr colorimetric system which includes each component of Y(yellow)/M(magenta)/C(cyanogen) of the complementary-colors system from the YMC calorimetric system.

Moreover, the color-space inverse-transform unit 101 is equivalent to the inverse color-space conversion that is the reverse processing to the above color-space conversion.

Next, a description will be given of the color space transform (or inverse-transform) unit 101 and the wavelet transform (or inverse transform) unit 102 with reference to FIG. 2 and FIG. 3.

Figure 2:
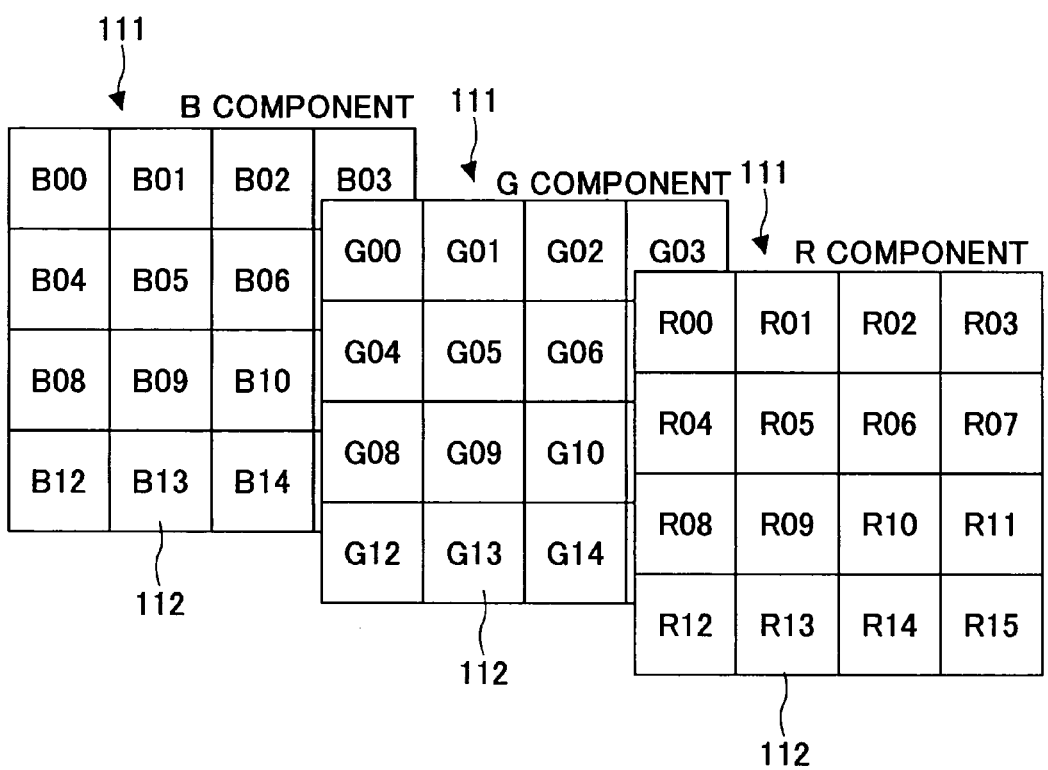
FIG. 2 is a diagram illustrating the hierarchical coding algorithm and the JPEG2000 algorithm.

Generally, the color image is divided into rectangular portions where each color component (RGB primary-colors system) of the original picture is arranged as shown in FIG. 2.

The rectangular portion is generally called the block or the tile, and it is common to call it the tile as for this divided rectangular portion according to the JPEG2000. It is hereinafter made to describe such a divided rectangular portion as being the tile. In the example of FIG. 2, each component 111 (RGB) is divided in each direction into 4×4 rectangular portions 112. Each of the 16 pieces of the rectangles 112 is called the tile.

Each tile 112 of the component 111 (which is, in the example of FIG. 2, R00, R01, . . . , R15, G00, G01, . . . , G15, B00, B01, . . . , B15) serves as the base unit at the time of performing the compression or expansion process of the image data. Therefore, the compression or expansion operation of the image data is performed independently for every component and for every tile.

After the data of each tile 112 of each component 111 are input into the color-space transform (or inverse-transform) unit 101 of FIG. 1, and color-space transform is performed at the time of the coding of the image data, 2-dimensional wavelet transform (forward transform) is performed by the 2-dimensional wavelet transform 112, and space division is carried out in the frequency domain.

FIG. 3 shows the sub-band in each decomposition level in case the number of decomposition levels is 3.

The tile of the original image is initially obtained. To the original image tile (OLL) (decomposition level 0), 2-dimensional wavelet transform is performed by the wavelet transform unit 102 and the sub band (1LL, 1HL, 1LH, 1HH) shown in the decomposition level 1 is separated.

Subsequently, to low-frequency component 1LL in this layer, 2-dimensional wavelet transform is performed by the wavelet transform unit 102 and the sub band (2LL, 2HL, 2LH, 2HH) shown in the decomposition level 2 is separated.

Similarly, 2-dimensional wavelet transform is performed by the wavelet transform unit 102 also to low-frequency component 2LL, and the sub band (3LL, 3HL, 3LH, 3HH) shown in the decomposition level 3 is separated one by one.

As shown in FIG. 3, the sub band set as the object of the coding in each decomposition level is indicated by the dotted area.

For example, when the number of decomposition levels is set to 3, the sub band components (3HL, 3LH, 3HH, 2HL, 2LH, 2HH, 1HL, 1LH, 1HH) indicated by the dotted area serve as the candidate for the coding, and the sub band component 3LL is not coded.

Subsequently, the bit set as the object of the coding in the turn of the specified coding is appointed, and the context is generated from the bit of the object bit circumference by the quantization (inverse quantization) unit 103 shown in FIG. 1.

The wavelet coefficients after the processing of the quantization are divided into the rectangles that are called the precincts and not overlapping for each of the sub bands. This is introduced in order to use the memory efficiently by implementation.

Figure 4:
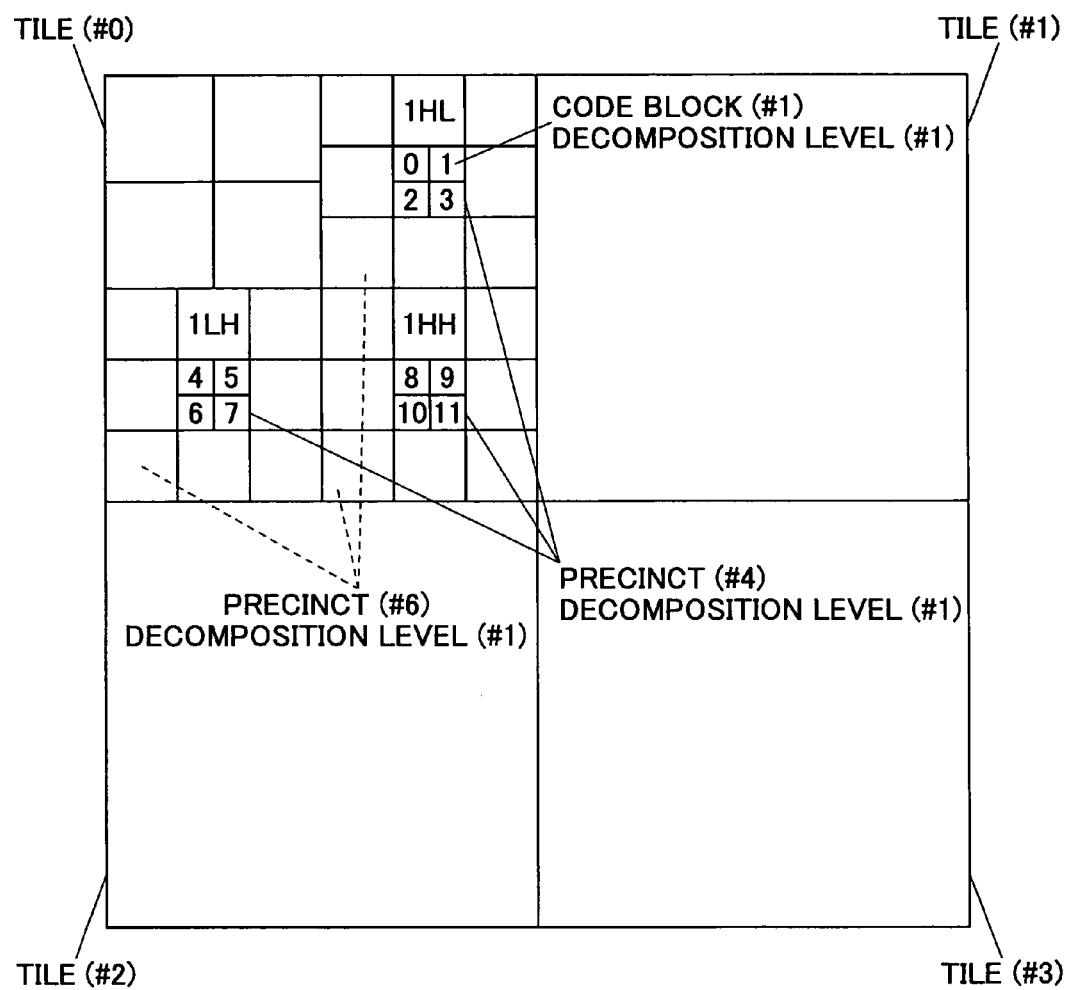
FIG. 4 is a diagram illustrating the hierarchical coding algorithm and the JPEG2000 algorithm.

As shown in FIG. 4, one precinct includes the three rectangular portions that are spatially in agreement.

Furthermore, each precinct is divided into the code block of the rectangle not overlapping. This serves as the base unit at the time of performing entropy coding.

The wavelet coefficients after the discrete wavelet transform (DWT) is performed may be subjected to the quantization and entropy encoding. However, according to the JPEG2000 algorithm, it is also possible that the wavelet coefficients are divided into the bit-plane components, and the ordering of the bit-plane components is performed for each pixel or code block, in order to raise the efficiency of encoding.

Figure 5:
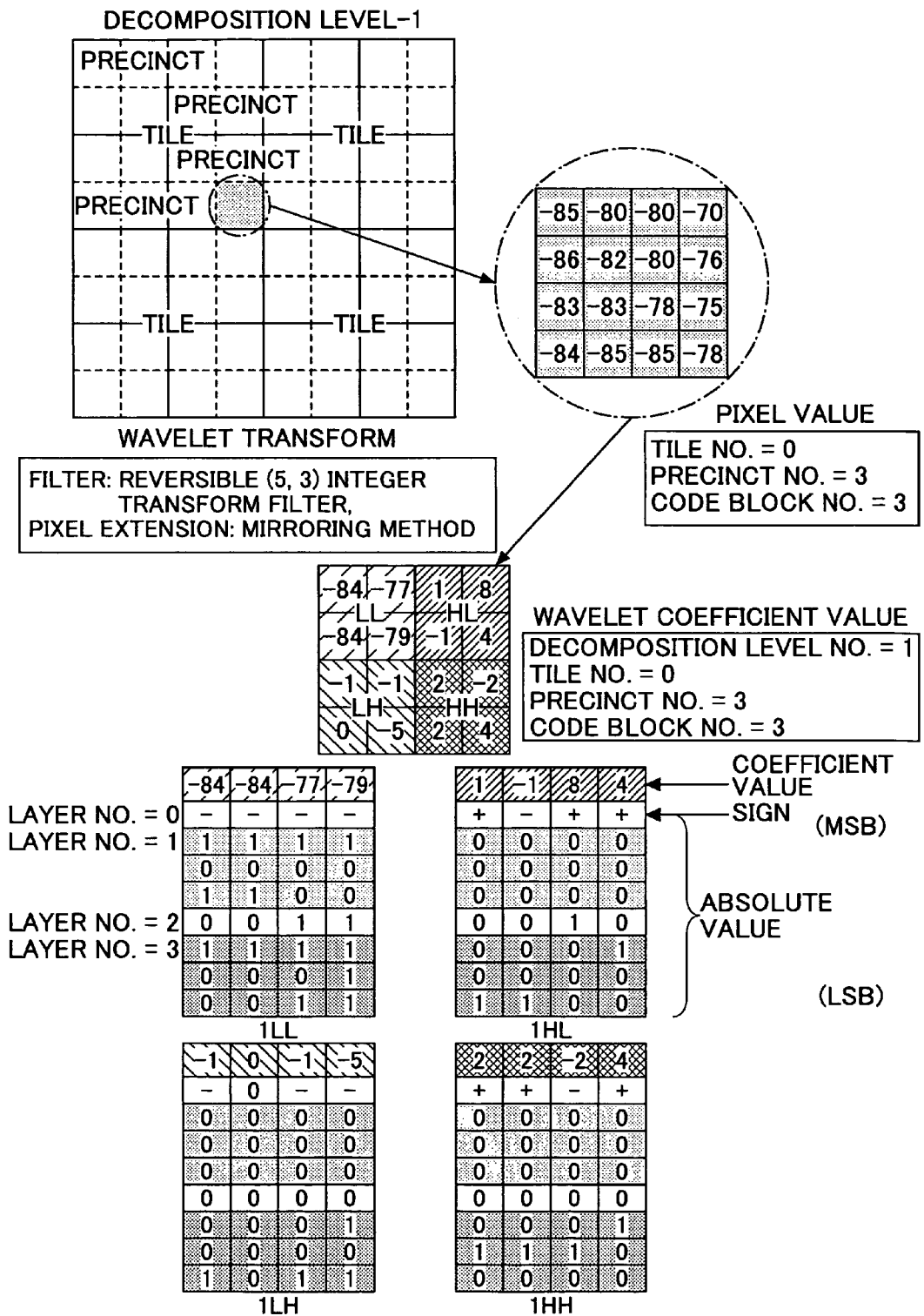
FIG. 5 is a diagram illustrating the hierarchical coding algorithm and the JPEG2000 algorithm.

FIG. 5 shows the procedure of the wavelet coefficient division and the bit-plane component ordering. In the example of FIG. 5, the original image containing 32×32 pixels is divided into four tile components each containing 16×16 pixels. The magnitude of each precinct of decomposition level 1 is 8×8 pixels, and the magnitude of each code block of decomposition level 1 is 4×4 pixels. The precinct number and the code block number are allocated in the order of the raster scanning. The mirroring method is used for the pixel extension beyond the tile component. The wavelet transform is performed with the reversible (5, 3) integer transform filter, so that the wavelet coefficients of decomposition level 1 are obtained.

The outline of the typical layers with respect to the tile number 0/the precinct number 3/the code block number 3 is also shown in FIG. 5. The structure of the layers can be easily understood by viewing the wavelet coefficients in the horizontal direction (the bit-plane direction). A single layer is composed of a number of the bit-plane components. In the example of FIG. 5, each of the layer number 0, 1, 2, 3 is composed of the three bit-plane components 1, 3, 1. The layer containing the bit-plane components nearer to the LSB (least significant bit) is subjected to the quantization earlier, while the layer containing the bit-plane components nearer to the MSB (most significant bit) is not subjected to the quantization and remains unchanged. The method that truncates the layer near to the LSB is called the truncation, and it is possible to control the quantization ratio appropriately by using the truncation.

In the entropy coding/decoding unit 104 shown in FIG. 1, probability presumption from the context and the object bit enables the encoding of the tile of each component to be performed. In this way, coding processing of the tiles about all the components of the original image is performed.

Figure 6:
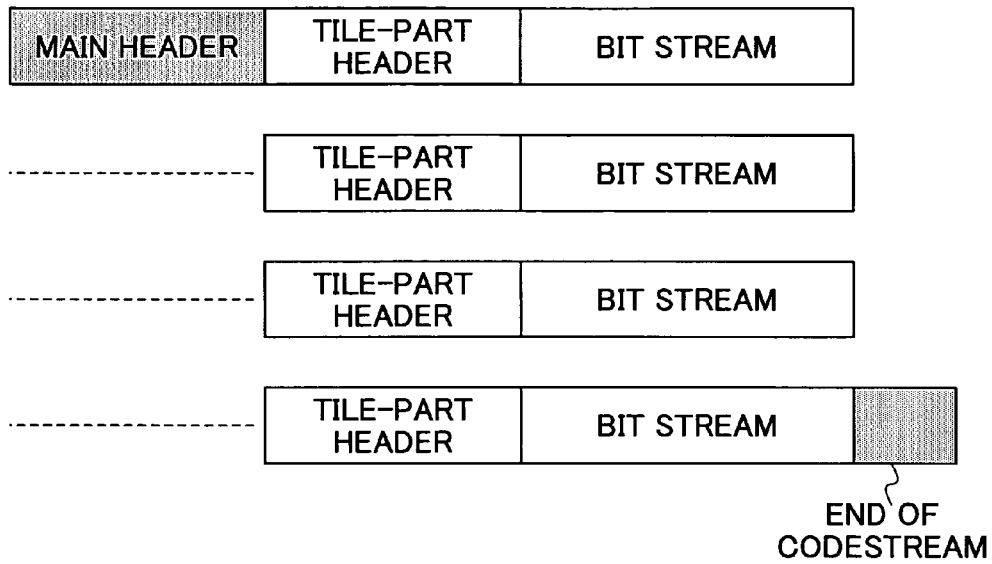
FIG. 6 is a diagram illustrating the structure of one frame of the codestream produced by a tag processing unit in the system of FIG. 1.

FIG. 6 shows the composition of one frame of the codestream that is produced by the tag processing unit 105.

The tag information, called the main header, is disposed at the beginning of this codestream. After the main header, the tile-part header of the codestream (bit stream) of each tile, and the coding data of each tile are continuously disposed. And, the tag (end of codestream) is disposed at the end of the codestream.

On the other hand, at the time of decoding of the codestream, the image data is generated from the codestream of each tile of each component that is the reverse processing to the coding of the image data.

In this case, the tag processing unit 105 interprets the tag information added to the codestream that is inputted from the exterior, decomposes the codestream into the codestream of each tile of each component, and performs decoding processing for every codestream of each tile of each of that component.

While the location of the bit set as the object of decoding in the turn based on the tag information in the codestream is defined at this time, the context is generated in quantization and the inverse quantization unit 103 from the row of the circumference bit (decoding is already completed) of the object bit position.

In the entropy coding/decoding unit 104, the codestream is decoded by probability presumption from this context, the object bit is generated, and it is written in the location of the object bit.

Thus, the space division of the decoded data is carried out for every frequency band, each tile of each component of the image data is restored in this way by performing the 2-dimensional wavelet inverse transformation at the 2-dimensional wavelet inverse-transform unit 102.

The restored data are changed into the image data of the original calorimetric system by the color-space inverse-transform unit 101.

In the entropy coding/decoding unit 104 of FIG. 1, probability presumption performs coding to the tile of each component from the context and the object bit. In this way, coding processing is performed per tile about all the components of the subject-copy image.

Finally, the tag processing unit 105 performs processing which attaches the tag to the coded data from the entropy coding unit to form the codestream.

The structure of the codestream is briefly shown in FIG. 6. As shown in FIG. 6, the tag information called header is added to the head of the codestream, and the head of the partial tile that constitutes each tile, and the coded data of each tile continues after that. And the tag is again put on the termination of the codestream.

On the other hand, at the time of the decoding, the image data is generated from the codestream of each tile of each component contrary to the time of coding. As shown in FIG. 1, in this case, the tag processing unit 105 interprets the tag information added to the codestream inputted from the exterior, and decomposes the codestream into the code stream of each tile of each component, and decoding processing is performed for every code data of each tile of each component.

The position of the bit set as the object of the decoding in the sequence based on the tag information in the codestream is defined. In the quantization/inverse-quantization unit 103, the context is generated from the list of the circumference bits (the decoding of which is already completed) of the object bit position.

In the entropy coding/decoding unit 104, the codestream is decoded by probability presumption from this context and the codestream so that the object bit is generated and it is written in the presumed position of the object bit.

The space division of the decoded data is carried out for every frequency band, and each tile of each component of the image data is restored in this way by performing the 2-dimensional wavelet inverse transformation at the 2-dimensional wavelet transform/inverse-transform unit 102. The restored data is transformed into the image data of the original color system at the color-space transform/inverse-transform unit 101.

The above description relates to the outline of the JPEG2000 algorithm that deals with the image processing method for a still picture, or a single frame. It is extended to the Motion-JPEG2000 algorithm that deals with the image processing method for a moving picture including a plurality of frames.

Next, a description will be given of an example of the codestream format according to the JPEG2000 algorithm.

Figure 7:
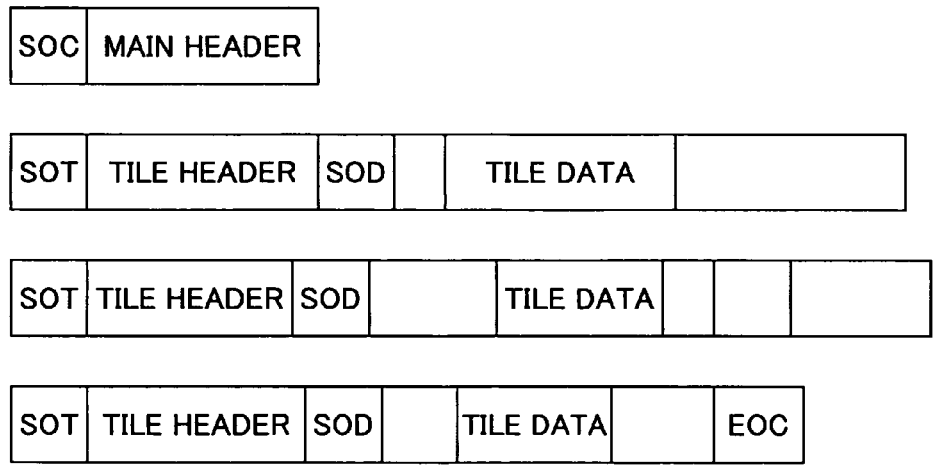
FIG. 7 is a diagram illustrating an example of the codestream format according to the JPEG2000 algorithm.

FIG. 7 is a diagram illustrating an example of the codestream format according to the JPEG2000 algorithm. As in the codestream format of FIG. 7, the codestream starts with the SOC (start of codestream) marker that indicates the beginning of the codestream. After the SOC, the main header, which describes the parameters of coding and the parameters of quantization, follows, and the actual code data of the codestream follows thereafter.

The actual code data starts with the SOT (start of tile-part) marker, and further includes the tile header, the SOD (start of data) marker, and the tile data (code data).

After the code data that is equivalent to the whole image data, the EOC (end of codestream) marker, which indicates the end of the codestream, is added.

Next, a description will be given of the preferred embodiments of the invention with reference to FIG. 8 through FIG. 18.

Figure 8:
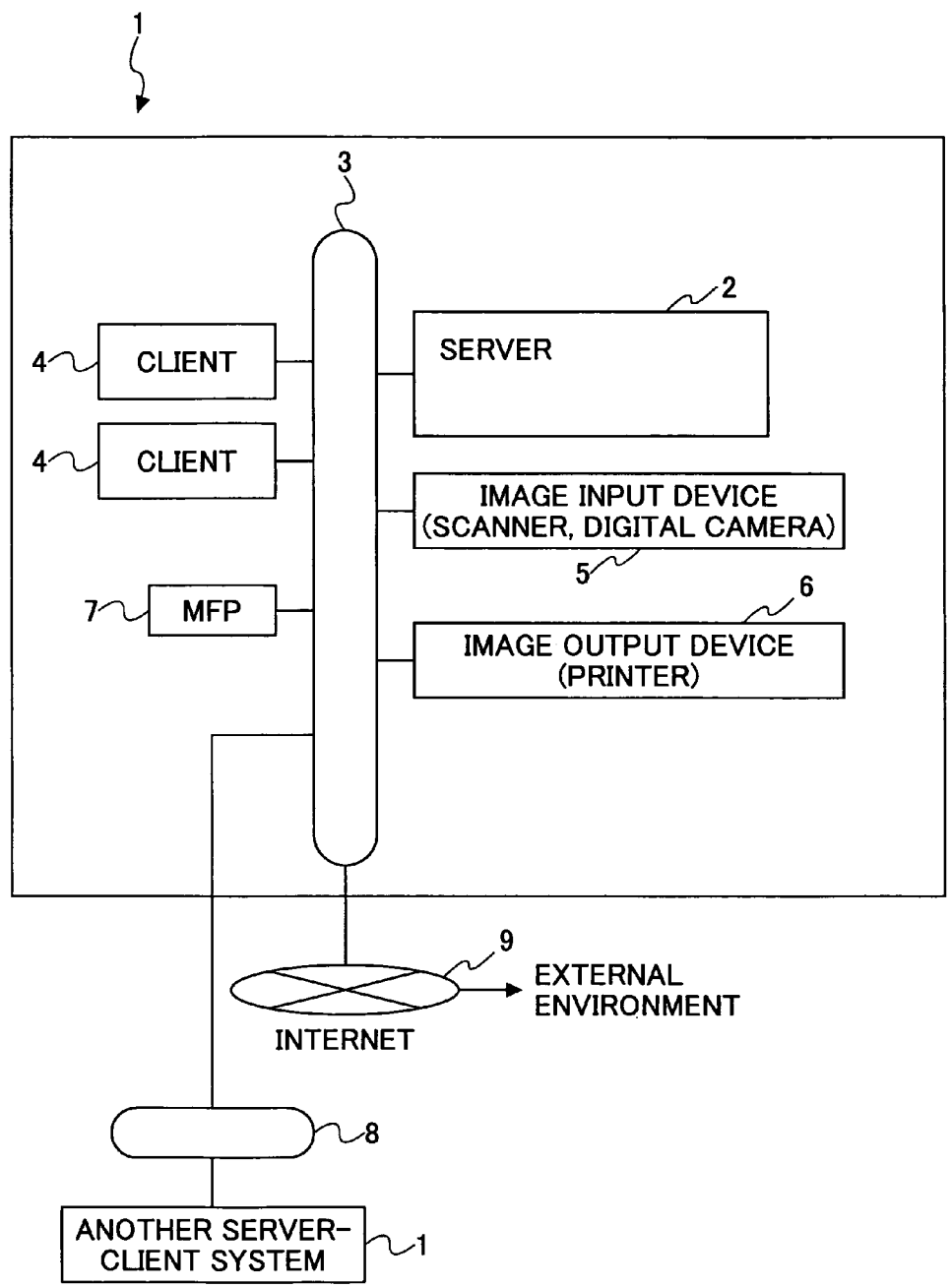
FIG. 8 is a block diagram of a server-client system including a server to which a preferred embodiment of the image processing apparatus of the invention is applied.

FIG. 8 shows a server-client system including a server to which a preferred embodiment of the image processing apparatus of the invention is applied.

It is assumed that in the image data processing system of the present embodiment, the server client system 1 is constructed by two or more client computers 4 which are connected to the server 2 through the network 3, such as LAN (local area network).

The server client system 1 is provided such that the image output device 6, such as a printer, and the image input device 5, such as a scanner or a digital camera, can be shared on the network 3.

Moreover, the server client system 1 may be provided such that the multifunction peripheral (MFP) 7 is connected to the network 3 and the MFP 7 may function as the image input device 5 or the image output device 6 which can be shared on the network 3.

The server client system 1 is constructed so that the server client system 1 can perform the data communication with another server client system 1 through the intranet 8, and can perform the data communication with the external environment through the Internet communication network 9.

It is assumed that the server 2 in the present embodiment acts as the contents distribution source on the Internet communication network 9. In the server 2, various kinds of image data are created, and compression coding of the image data is carried out according to the JPEG2000 algorithm. The server 2 transmits the encoded image data to various distribution locations through the Internet communication network 9.

Figure 9:
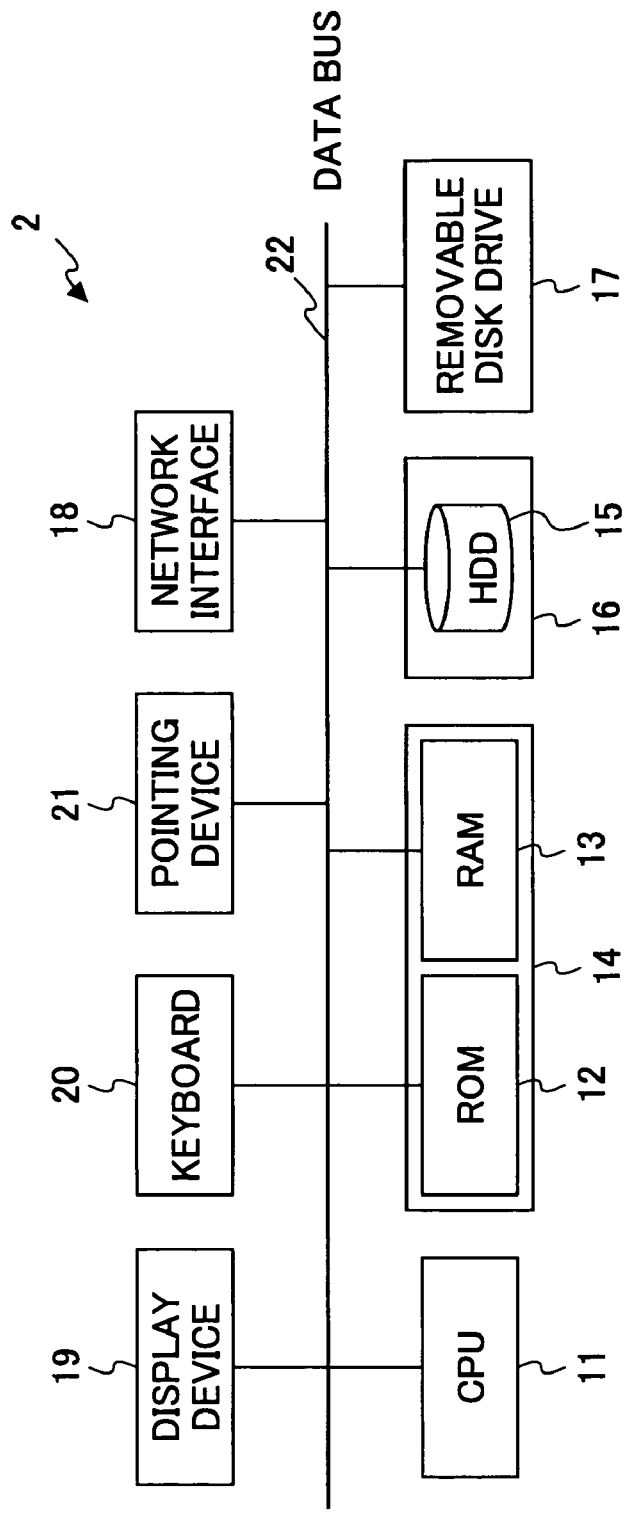
FIG. 9 is a block diagram of an embodiment of the server in the server-client system of FIG. 8.

FIG. 9 shows the composition of the server 2 that is the image processing apparatus of the present embodiment.

The server 2 includes the CPU (central processing unit) 11 that processes information, and the primary storage 14 containing the ROM (read only memory) 12 and the RAM (random access memory) 13 which store the information. The server 2 further includes the secondary storage 16 containing the HDD (hard disk drive) 15 which stores the compression codestream, and the removable disk drive 17, such as the CD-ROM drive, which retains information, receives information from the exterior and delivers the information to the exterior.

The server 2 further includes the network interface 18 which communicates with an external computer via the network 3 to receive and transmit information from and to the external computer, the display monitor 19, such as the CRT (cathode ray tube) or the LCD (liquid crystal display), on which operational information is displayed to the operator, the keyboard 20 from which the operator inputs the commands or messages to the CPU 11, and the pointing device 21, such as the mouse.

These elements of the server 2 are interconnected by the data bus 22. The bus controller of the data bus 22 serves to arbitrate the data transmitted and received between these elements of the server 2.

When the server 2 is powered up by the user, the CPU 11 starts execution of the program called the loader stored in the ROM 12, and the CPU 11 reads the program called the operating system which manages the hardware and software of the computer, from the HDD 15 into the RAM 13. The CPU 11 starts execution of the operating system on the RAM 13. The operating system starts execution of the application program, reads information and stores information according to operations of the user. As typical ones of the operating system, Windows (registered trademark), UNIX (registered trademark), etc. are known.

The program that runs on the operating system is called the application program. In the present embodiment, the server 2 stores the image processing program in the HDD 15 as an application program. In this meaning, the HDD 15 functions as a storage medium storing the image processing program.

Moreover, generally, the programs installed in the secondary storage 16, such as the HDD 15, in the server 2 are recorded on magnetic media, such as FD, or optical information recording media, such as CD-ROM or DVD-ROM, etc., and the recorded programs are installed into the secondary storage 16 such as the HDD 15.

For this reason, the portable storage media, such as magnetic media (such as FD) and optical information recording media (such as CD-ROM) may also function as a storage medium storing the image processing program.

Furthermore, the image processing program may be received from the exterior through the network interface 18, and may be installed in the secondary storage 16 such as the HDD 15.

When the execution of the image processing program operating on the operating system is started in the server 2, the CPU 11 performs various kinds of logic and arithmetic operations according to the image processing program, and controls the respective parts intensively.

Moreover, the server 2 of the present embodiment is provided with the respective functional blocks of JPEG2000 algorithm previously described with reference to FIG. 1, and according to JPEG2000 algorithm the server 2 of the present embodiment performs the compression coding of image data.

Namely, the functions of the compression coding and decoding units as shown in FIG. 1 may be carried out by either the processing of the hardware or the processing of the software which is performed by the CPU 11 based on the image processing program stored in the HDD 15. Thereby, when creating and saving the contents image etc., the compression coding of the digital image data inputted from the various image input devices 5, 7 and 4 is carried out according to JPEG2000 algorithm, and the codestream of each compressed image is generated or stored. Fundamentally, the image is divided into two or more rectangular portions (tiles), and the discrete wavelet transform of the pixel values for every rectangular portion is carried out, and the hierarchical compression coding is carried out in the server 2 of the present embodiment.

Figure 10:
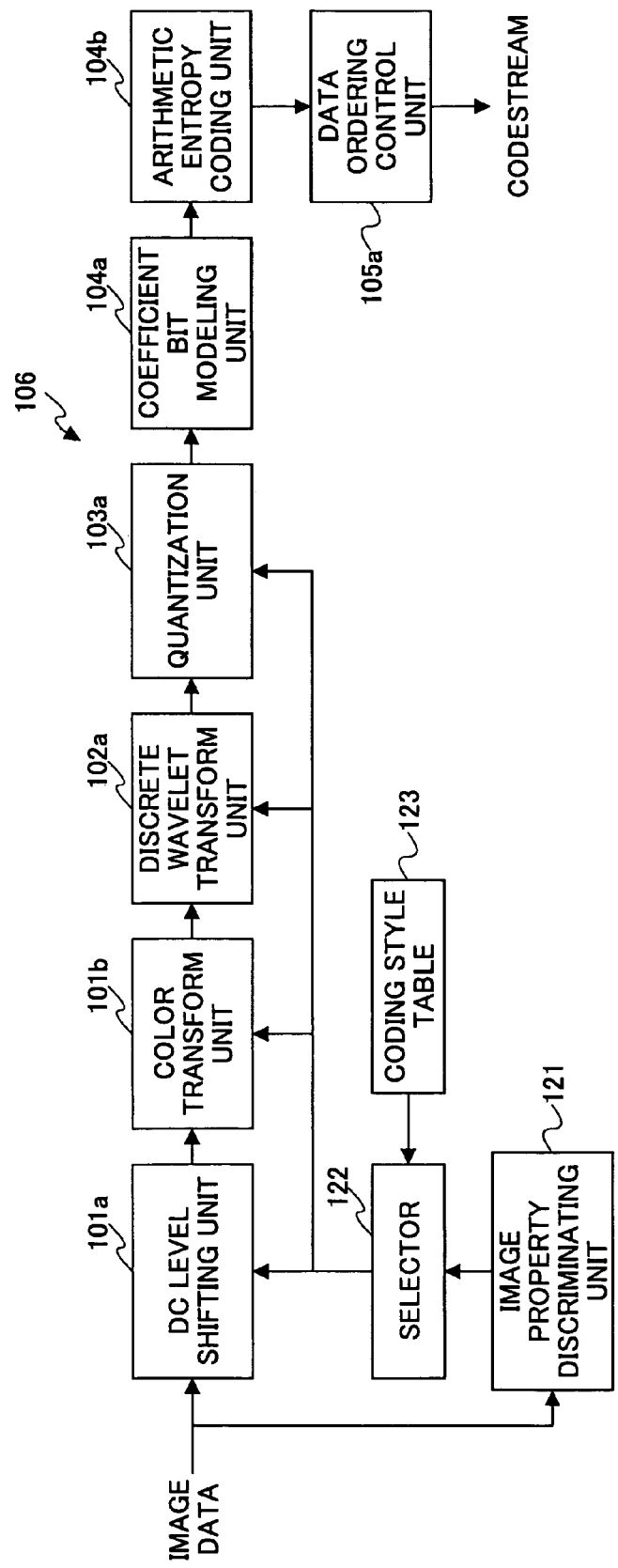
FIG. 10 is a block diagram of the preferred embodiment of the image processing apparatus of the invention.

FIG. 10 shows the preferred embodiment of the image processing apparatus in which the compression coding unit according to JPEG2000 algorithm of FIG. 1 is reconstructed.

As shown in FIG. 10, the compression coding unit 106, which is the image processing apparatus of the present embodiment, comprises a DC-level shifting unit 101*a*, a color transform unit 101*b*, a discrete wavelet transform unit 102*a*, a quantization unit 103*a*, a coefficient bit modeling unit 104*a*, an arithmetic entropy coding unit 104*b*, and a data ordering control unit 105*a*, which are arranged in order of processing.

In the present embodiment, the DC-level shifting unit 101*a* and the color transform unit 101*b* are included in the color space transform (or inverse transform) unit 110.

The DC-level shifting unit 101*a* performs level-conversion processing which subtracts one half of the dynamic range of the input image signal from each signal value using a predetermined transformation formula, when the input image signal indicates the positive number like the RGB signal value. The color transform unit 101*b* performs color transform processing that raises the compression efficiency of the color image by transforming the RGB image into the YCbCr image of the brightness color-difference system.

The discrete wavelet transform unit 102*a* is included in the 2-dimensional wavelet transform (or inverse transform) unit 102, and performs the transforming of the image data into the wavelet coefficients as described above.

The quantization unit 103*a* is included in the quantization (or inverse quantization) unit 103, and performs processing which reduces the dynamic range of the wavelet coefficients, in order to perform efficient compression. As an example of the quantization processing, there is the post quantization method in which quantization is performed by discarding the low-rank bit plane of the completed codestream by using the bit planes of the entropy coding which is the subsequent step.

The coefficient bit modeling unit 104a and the arithmetic entropy coding unit 104b are included in the entropy coding (or decoding) unit 104. Among these, in the coefficient bit modeling unit 104a, the bit model for the binary arithmetic coding is created from the multiple-value wavelet coefficients that are the object of encoding, and the coding method is determined by this processing. As for the coding method in the arithmetic entropy coding unit 104b, the MQ-coding method, which is the new bi-level image coding method, is used. The data ordering control unit 105a is included in the tag processing unit 105.

In addition to the compression coding unit 106, which is adapted in conformity with JPEG2000 algorithm, the image processing apparatus of the present embodiment includes an image property discriminating unit 121, a selector 122 and a coding style table 123. The image property discriminating unit 121 distinguishes the characteristics of document image data inputted as a processing object, and outputs a discriminating signal indicating the characteristics of the image data.

The selector 122 is a coding style selection unit, which selectively activates coding functions of the compression coding unit 106 in response to the discriminating signal outputted from the image property discriminating unit 121, so that the active coding functions of the compression coding unit 106 are suited to the characteristics of the image data.

The image property discriminating unit 121 distinguishes the characteristics of the image data inputted as the object of the compression coding by the compression coding unit 106. Specifically, the image types that are distinguished by the image property discriminating unit 121 include any of a natural image, a computer graphics image (CG image), a palletized image (limited color image), a monochrome image, and a bi-level image. The image property discriminating unit 121 outputs a discriminating signal indicating the characteristics of the image data as the result of the discrimination, to the selector 122.

A known method of distinguishing the characteristics of the image data may be used for the image property discriminating unit 121, and a detailed description thereof will be omitted. However, a brief description thereof will be given in the following.

For example, in a case of the bi-level image, such as a text image, it is constituted from the white background and the black character regions. The pixel value in many cases indicates a gradation value that is the maximum gradation value or the minimum gradation value. In a known method of distinguishing the characteristics of the image data of a bi-level image, a histogram of the gradation values (or levels) in the image data is created. When a deviation is detected in the resulting histogram, the method determines the characteristics of the image data as being a bi-level image. When there is no deviation, the method determines the characteristics of the image data as being a natural image. For example, Japanese Laid-Open Patent Application No. 2000-222564 discloses such a method.

Moreover, the CG image is a typical one of the artificial images. In a case of the CG image, there is a clear correlation between the pixel of concern and the surrounding pixels. Conversely, in a case of the natural image, there is only a weak correlation between the pixel of concern and the surrounding pixels. In a known method of distinguishing the characteristics of the image data of a CG image, a correlation between the pixel of concern and the surrounding pixels in the image data is calculated. The method determines the characteristics of the image data as being the CG image when the correlation is clear. When the correlation is weak, the method determines the characteristics of the image data as being the natural image. For example, Japanese laid-Open Patent Application No. 2002-194417 discloses such a method.

Furthermore, a known method of distinguishing the characteristics of the image data is based on the principle that when the number of colors in the image data is one, the image is determined as the monochrome image, when the number of colors in the image data is a small number, the image is determined as the palletized image, and otherwise the image is determined as the natural image. For example, Japanese Laid-Open Patent Application No. 11-88700 discloses such a method.

The selector 122 selectively activates the coding functions of the compression coding unit 106 in response to the discriminating signal outputted from the image property discriminating unit 121, so that the active coding functions of the compression coding unit 106 are suited to the characteristics of the image data.

Specifically, among the coding functions of the JPEG2000 algorithm, the selector 122 activates in response to the discriminating signal any processing of the coding functions arranged prior to the stage of processing of the coefficient bit modeling unit 104a, including the processing of the DC-level shifting unit 101a, the processing of the color transform unit 10b, the processing of the 2-dimensional discrete wavelet transform unit 102a, and the processing of the quantization unit 103a, as in the image processing apparatus of FIG. 10.

FIG. 11 shows the contents of the coding style table 123 in the image processing apparatus of the present embodiment. The coding style table 123, which is stored in the ROM 12 for example, specifies how the coding functions of the compression coding unit 106 are selected by the selector 122 in response to the respective characteristics of the image data.

In the present embodiment, the selector 122 selectively activates the coding functions of the compression coding unit 106 by making reference to the coding style table 123 in response to the discriminating signal, so that the activated coding functions of the compression coding unit 106 are suited to the characteristics of the image data.

Specifically, as shown in the coding style table 123 of FIG. 11, in the case of the natural image, all the processings of the DC level shifting unit 101a, the color transform unit 101b, the 2-dimensional wavelet transform unit 102a, and the quantization unit 103a are activated as indicated by "O" marks in FIG. 11.

In the case of the palletized image or the bi-level image, all the processings of the DC level shifting unit 101a, the color transform unit 101b, the 2-dimensional wavelet transform unit 102a, and the quantization unit 103a are deactivated as indicated by "X" marks in FIG. 11.

In the case of the CG image, only the processing of the quantization unit 103a may be activated optically as indicated by "Δ" mark in FIG. 11. This means that whether the processing of the quantization unit 103a in the case of the CG image is activated or deactivated may be set up optionally by the initial setting.

In the case of the monochrome image, the processings of the DC-level shifting unit 101a, the 2-dimensional wavelet transform unit 102a, and the quantization unit 103a are activated.

In the present embodiment, the functions of the image property discriminating unit 121 and the selector 122 are achieved by the hardware of the image processing apparatus. Alternatively, the above-described embodiment may be modified so that the functions of the image property discriminating unit 121 and the selector 122 are achieved by the software processing which is executed by the CPU 11 in accordance with the image processing program stored in the HDD 15.

When taking into consideration the features of the compression coding according to JPEG2000 algorithm, the bit-plane coding is one of the frequently used coding methods. Even when the input image has the characteristics that each pixel can be expressed with 1-bit information, such as a bi-level image and a palletized image, it is necessary to perform the encoding of two or more bit planes according to JPEG2000 algorithm. This means that the unnecessary coding processing is performed. The coding efficiency becomes poor, and also the processing speed becomes low. The same discussion is also applicable to the case of the CG image.

Moreover, in the case of the monochrome image, each pixel can be expressed with a single color. In this case, the processing of the color transform unit 101b is almost meaningless, and it is not necessary to perform the processing of the color transform unit 101b for the case of the monochrome image.

To eliminate the problems of the JPEG2000 algorithm, in the image processing apparatus of the present embodiment, the compression coding unit 106 performs all the coding functions of the compression coding of the image data only when the input image is the natural image, such as a photograph. When the input image is the image with other characteristics, the compression coding unit 106 performs only the active coding functions of the compression coding. Some of the DC level-conversion processing, the color transform processing, the 2-dimensional wavelet transform processing, and the quantization processing are deactivated according to the characteristics of the image data. The unnecessary processings are not performed while the entropy coding processing (or the coefficient bit modeling processing) can be performed at the earliest possible stage. Therefore, the image processing apparatus of the present embodiment can provide improvement in the processing speed, and the coding efficiency can be raised.

Figure 12:
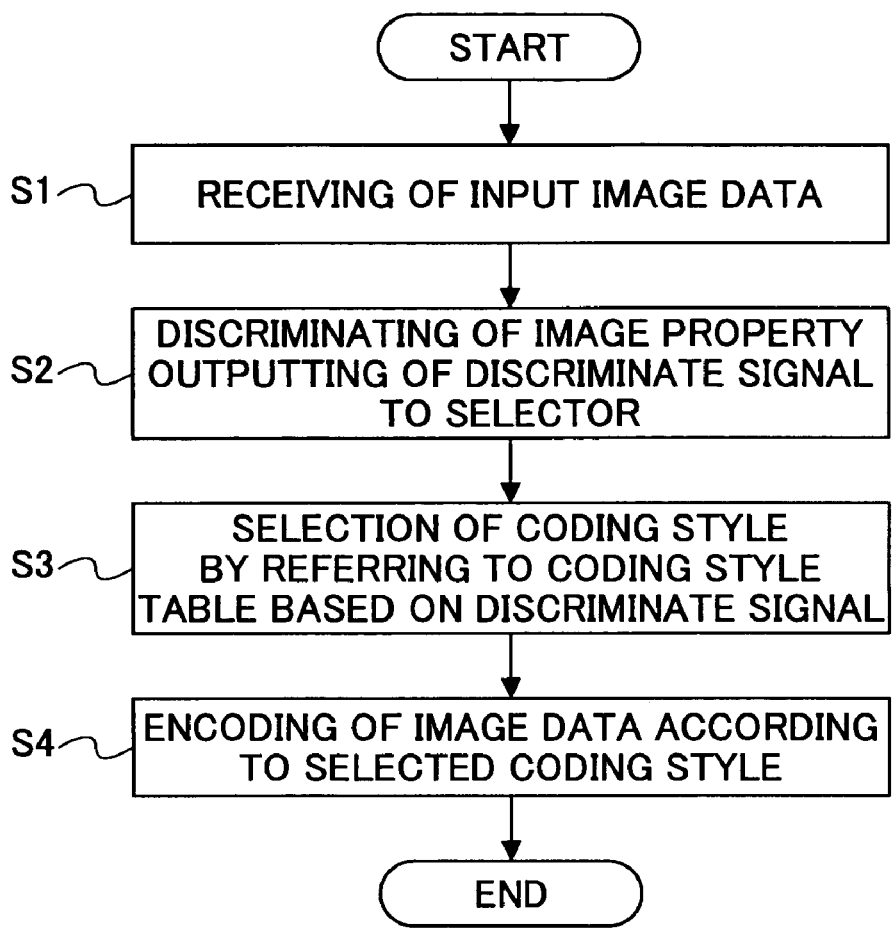
FIG. 12 is a flowchart illustrating operation of the image processing apparatus of the present embodiment.

FIG. 12 is a flowchart illustrating the operation of the image processing apparatus of the present embodiment.

As shown in FIG. 12, the image data inputted as the object of compression coding is received (S1).

The characteristics of the received image data are distinguished by the image property discriminating unit 121, and the discriminating signal indicating the characteristics of the image data is outputted to the selector 122 (S2).

The selector 122 selectively activates the coding functions of the compression coding unit 106 in response to the discriminating signal by making reference to the coding style table 123 based on the discriminating signal, so that the active coding functions of the compression coding unit 106 are suited to the characteristics of the image data (S3).

When the coding style of the compression coding unit 106 is selected by this processing of the selector 122, the compression coding of the input image data is actually performed by the active coding functions of the compression coding unit 106 according to the selected coding style (S4).

The resulting code data is suitably stored in the HDD 15, which is presented for the use of a contents image or the like.

Figure 13A:
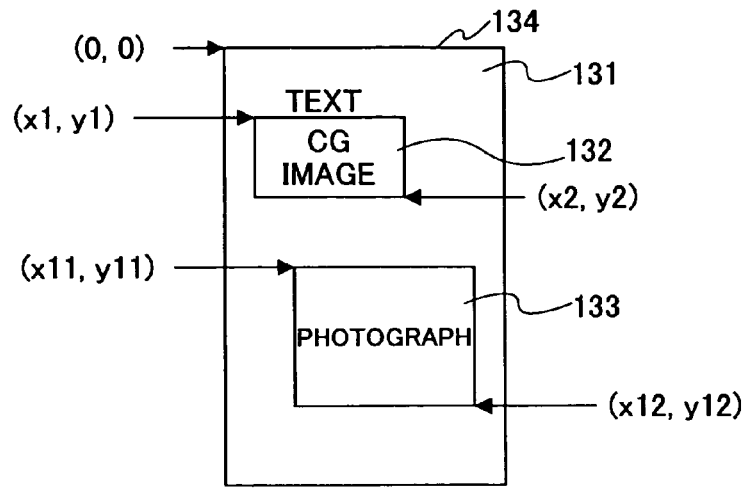
FIG. 13A, FIG. 13B and FIG. 13C are diagrams illustrating examples of the processing of the image processing apparatus of the invention.
Figure 13B:
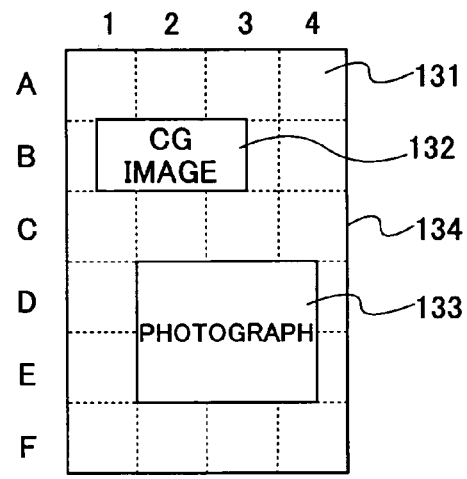
Figure 13C:
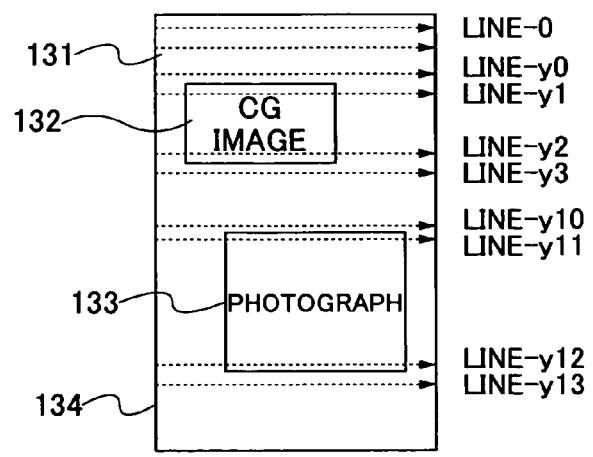

FIG. 13A, FIG. 13B and FIG. 13C are diagrams illustrating some examples of the processing of the image processing apparatus of the invention for a simple document 134 in which a text image 131, a CG image 132 and a natural image 133 (photograph) coexist in a mixed manner.

The first example of the processing of the image processing apparatus of the invention is a most simple method. In this method, the selective activation of the coding functions of the compression coding unit 106 by the selector 122 is decided by the largest one among the ratios of the respective regions of the text image 131, the CG image 132, and the natural image 133 in the whole document image data. Hence, a selected one of the coding style for the text image, the coding style for the CG image, and the coding style for the natural image is applied to the whole image data. In this case, the selective activation of the coding functions of the compression coding unit 106 by the selector 122 may be either a tile-based coding style selection or a rasterline-based coding style selection.

Figure 14A:
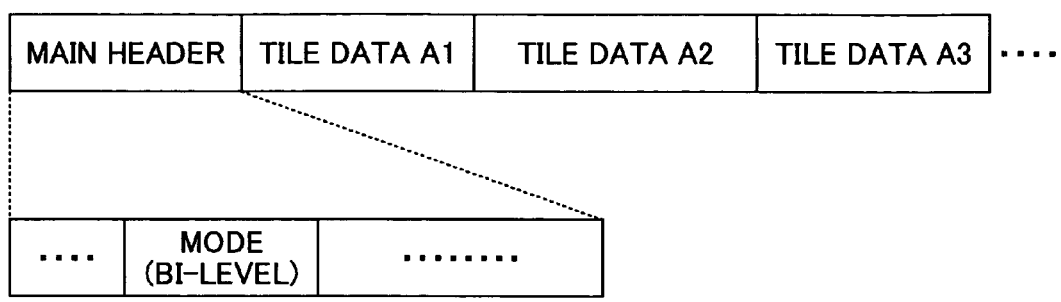
FIG. 14A and FIG. 14B are diagrams illustrating examples of the codestream created by a tile-based coding-style processing of the image processing apparatus of the invention.
Figure 14B:
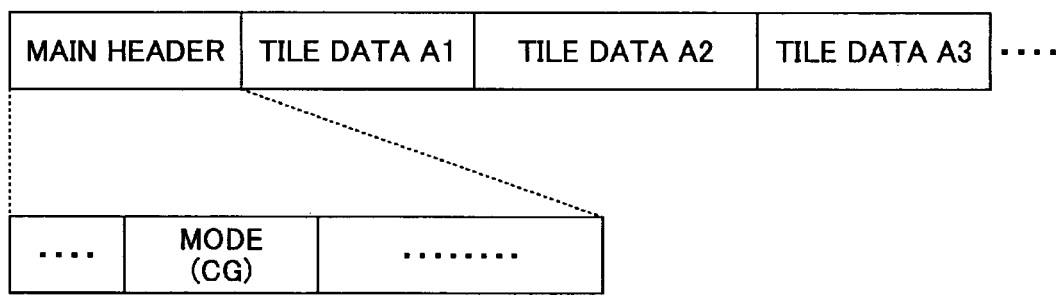

FIG. 14A and FIG. 14B are diagrams illustrating examples of the codestream created by a tile-based coding style processing of the image processing apparatus of the invention.

In this case, the compression coding unit 106 writes the coding style mode information that is indicative of which mode of the coding style is applied to the main header of the codestream created through the compression coding as shown in FIG. 14A or FIG. 14B. If this is performed, for the time of decoding of the codestream concerned, it is possible to decode the codestream into the image data without error by referring to this coding style mode information described in the main header.

The examples of FIG. 14A and FIG. 14B are the tile-based coding style processing (refer to FIG. 13B). In the example of FIG. 14A, the compression coding of the whole document image data is carried out by using the bi-level image mode of the coding style. In the example of FIG. 14B, the compression coding of the whole document image data is carried out by using the CG-image mode of the coding style.

The second, more practical example of the processing of the image processing apparatus of the invention is that the coding style mode is dynamically switched per a certain small region (or per tile) of the input image.

For example, the image data of a document shown in FIG. 13A is divided into two or more tiles A1, A2, . . . , F3, F4, as shown in FIG. 13B, and the coding style mode, specifying the selective activation of the coding functions of the compression coding unit 106 by the selector 122, is dynamically switched per tile between the several modes.

Figure 15:
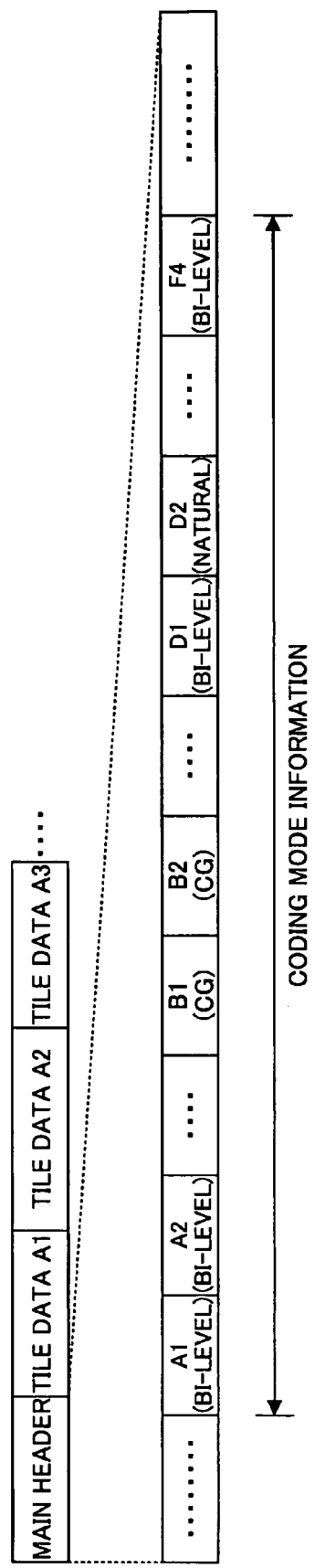
FIG. 15 is a diagram illustrating an example of the codestream created by a tile-based coding-style processing of the image processing apparatus of the invention.

FIG. 15 is a diagram illustrating an example of the codestream created by the tile-based coding style processing of the image processing apparatus of the invention. As shown in the example of FIG. 15, the compression coding unit 106 writes the coding style mode information that is indicative of which mode of the coding style is applied to the respective tile portions of the main header of the codestream created through the compression coding. If this is performed for the time of decoding of the codestream concerned, it is possible to decode the codestream into the reconstructed image data without error by referring to this coding style mode information described in the main header of the codestream.

Figure 16:
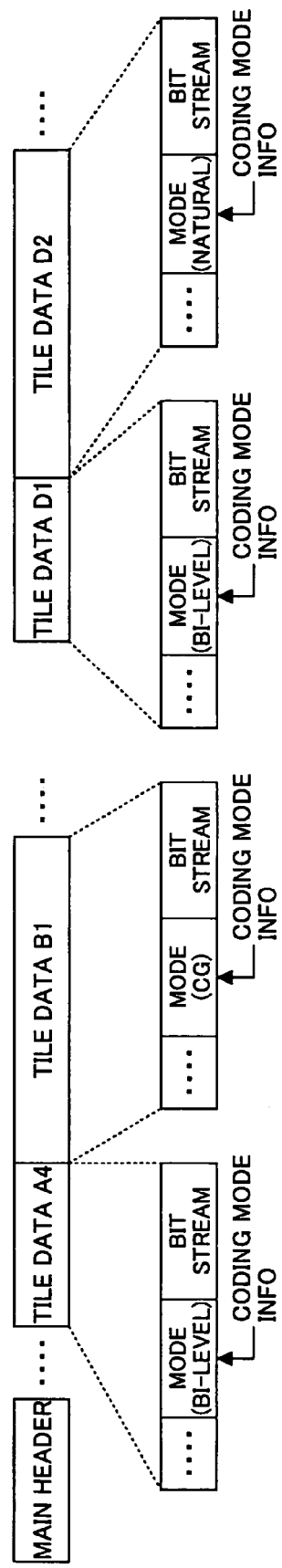
FIG. 16 is a diagram illustrating another example of the codestream created by the tile-based coding-style processing of the image processing apparatus of the invention.

Embodiments of the present invention are not limited to the example of FIG. 15 in which all the coding style mode information is described in the main header. FIG. 16 shows another example of the codestream created by the tile-based coding style processing of the image processing apparatus of the invention.

In the example of FIG. 16, the coding style mode information for each tile is described in the corresponding tile-part header of the codestream. If this is performed for the time of decoding of the codestream concerned, it is possible to decode the codestream into the reconstructed image data without error by referring to the coding style mode information described in the respective tile-part headers of the codestream.

The third, more practical example of the processing of the image processing apparatus of the invention is that the coding style mode is dynamically switched per a certain small region (or per rasterline) of the image.

For example, the image data of a document shown in FIG. 13A is divided into two or more rasterlines y0, y1, . . . as shown in FIG. 13C, and the coding style concerning the selective activation of the coding functions of the compression coding unit 106 by the selector 122 is dynamically switched per rasterline between the several modes.

FIG. 17 is a diagram illustrating an example of the codestream created by the rasterline-based coding style processing of the image processing apparatus of the invention. As shown in the example of FIG. 17, the compression coding unit 106 writes the coding style mode information that is indicative of which mode of the coding style is applied to the respective rasterline portions of the main header of the codestream created through the compression coding. If this is performed for the time of decoding of the codestream concerned, it is possible to decode the codestream into the reconstructed image data without error by referring to this coding style mode information described in the main header of the codestream.

In the example of FIG. 17, the bi-level mode is applied for the rasterline 0, and it is switched to the CG mode for the rasterline y1. Moreover, it is switched to the bi-level mode for the rasterline y3. Moreover, it is switched to the natural mode for the rasterline y11. Finally, it is switched to the bi-level mode for the rasterline y13.

Embodiments of the present invention are not limited to the example of FIG. 17 in which all the coding style mode information is described in the main header. FIG. 18 shows another example of the codestream created by the rasterline-based coding style processing of the image processing apparatus of the invention.

In the example of FIG. 18, the coding style mode information for each rasterline is described in the corresponding rasterline-part header of the bit stream of the codestream. If this is performed for the time of decoding of the codestream concerned, it is possible to decode the codestream into the reconstructed image data without error by referring to the coding style mode information described in the respective rasterline-part headers of the codestream.

In the above-described embodiment, the server 2 is provided with the image property discriminating unit 121. Alternatively, the above embodiment may be modified such that the server 2 does not include the image property discriminating unit 121, and the discriminating signal indicating the characteristics of the image data is externally supplied to the selector 122 of the server 2.

However, in the case in which the server 2 is provided with the image property discriminating unit 121, the discriminating signal indicating the characteristics of the image data is internally acquired in the server 2, and proper image processing is attained with the internally obtained discriminating signal.

In the above-described embodiment, after the characteristics of the image data are distinguished, the selective activation of the coding functions of the compression coding unit 106 by the selector 122 is effected by the result of the discrimination of the characteristics of the image data. Alternatively, the above embodiment may be modified such that the discrimination of the characteristics of the image data is not performed when the input image data is received.

In such modified embodiment, a set of kinds of compression coding processing for the received image data according to the four coding style modes as in the coding style table 12 shown in FIG. 11 are performed sequentially one by one or performed in parallel. It is assumed that the same coding style mode is used for a palletized image and a bi-level image. The coding efficiency (compressibility) of each of the codestreams obtained through the different coding style processings is computed respectively. One of the codestreams with the highest coding efficiency is selected as being the output codestream actually outputted from the compression coding unit 106.

According to such modified embodiment, two or more kinds of the compression coding processing in which the selective activation of the coding functions of the compression coding unit 106 by the selector 222 differs each other are performed, and one of the codestreams with the highest coding efficiency is automatically selected as the output codestream actually outputted from the compression coding unit 106. Consequently, there is no need to actually distinguish the characteristics of the image data, and the unnecessary coding functions of the compression coding unit are not performed, and the problems of JPEG2000 algorithm can be avoided.

In the above-mentioned embodiment, two or more kinds of the compression coding processing are performed for the image data, and one of the codestreams with the highest coding efficiency is automatically selected. Alternatively, the above embodiment may be modified such that one of the codestreams with the highest coding efficiency is not automatically selected, and the respective coding efficiencies and/or the respective levels of picture quality of the codestreams obtained through the different coding style processings are computed and displayed on the display monitor 19. The user is provided with the information of the displayed coding efficiencies (and/or the levels of picture quality) for selection of a desired coding style processing for the image data. One of the codestreams is selected in response to the user's choice as the output codestream actually outputted from the compression coding unit 106.

According to such modified embodiment, two or more kinds of the compression coding processing in which the selective activation of the coding functions of the compression coding unit 106 by the selector 222 differs each other are performed, the respective coding efficiencies and/or the respective levels of picture quality of the codestreams obtained through the different coding style processings are computed and displayed on the display monitor 19, and one of the codestreams is selected in response to the user's choice. For example, even when there is no great difference in coding efficiency, one of the codestreams with the higher one of the picture quality levels can be chosen. Consequently, there is no need to actually distinguish the characteristics of the image data, and the unnecessary coding functions of the compression coding unit are not performed, and the problems of JPEG2000 algorithm can be avoided.

The present invention is not limited to the above-described embodiments, and variations and modifications may be made without departing from the scope of the present invention.

Further, the present application is based on Japanese priority application No. 2003-003012, filed on Jan. 9, 2003, the entire contents of which are hereby incorporated by reference.

What is claimed is:

1. An image processing apparatus comprising:
a compression coding unit to perform compression coding of image data according to JPEG2000 algorithm, wherein the compression coding includes DC-level shifting processing, color transform processing, 2-dimensional discrete wavelet transform processing, quantization processing, coefficient bit modeling processing, arithmetic entropy coding processing, and data ordering control processing; and a coding style selection unit to selectively activate coding functions of the compression coding unit to cause the active coding functions of the compression coding unit to be suited to characteristics of the image data, wherein a coding style mode, specifying the selective activation of the coding functions of the compression coding unit by the coding style selection unit, is dynamically switched per a portion of the image data between different coding style modes;

an image property discriminating unit to distinguish the characteristics of the image data and outputting a discriminating signal indicating the characteristics of the image data, wherein at least one of the compression coding unit, the coding style selection unit, and the image property discriminating unit are implemented with a processor;

wherein the DC-level shifting processing, the color transform processing, the 2-dimensional discrete wavelet transform processing, and the quantization processing are subjected to the selective activation of the coding functions by the coding style selection unit in response to the discriminating signal, and wherein the coding style selection unit activates the processing operations of DC-level shifting, color transform, 2-dimensional discrete wavelet transform and quantization in the compression coding unit when the discriminating signal indicates a natural image, the coding style selection unit deactivating the processing operations of DC-level shifting, color transforming, 2-dimensional discrete wavelet transform and quantization in the compression coding unit when the discriminating signal indicates a palletized image or a bi-level image, the coding style selection unit activating only the quantization processing optionally when the discriminating signal indicates a computer graphics image, and the coding style selection unit activating the processing operations of DC-level shifting, 2-dimensional discrete wavelet transform and quantization in the compression coding unit when the discriminating signal indicates a monochrome image.

2. The image processing apparatus of claim 1 wherein the coding style selection unit is operable to make reference to a coding style table which specifies how the coding functions of the compression coding unit are selected by the coding style selection unit in response to respective characteristics of the image data.

3. The image processing apparatus of claim 1 wherein the discriminating signal indicates the characteristics of the image data, and any of a natural image, a computer graphics image, a palletized image, a monochrome image and a bi-level image is set to the discriminating signal as the object of compression coding.

4. The image processing apparatus of claim 1 wherein the portion of the image data is a tile that is defined when the image data is divided into a plurality of tiles, each of which is subjected to the compression coding.

5. The image processing apparatus of claim 1 wherein the portion of the image data is a rasterline that is defined when the image data is divided into a plurality of rasterlines, each of which is subjected to the compression coding.

6. The image processing apparatus of claim 4 wherein the compression coding unit is operable to describe a coding style mode information, indicating a selected coding style mode for every tile, in a main header of a codestream created as a result of the compression coding.

7. The image processing apparatus of claim 5 wherein the compression coding unit is operable to describe a coding style mode information, indicating a selected coding style mode for every rasterline, in a main header of a codestream created as a result of the compression coding.

8. The image processing apparatus of claim 4 wherein the compression coding unit is operable to describe a coding style mode information, indicating a selected coding style mode for every tile, in a corresponding tile-part header of a codestream created as a result of the compression coding.

9. The image processing apparatus of claim 5 wherein the compression coding unit is operable to describe a coding style mode information, indicating a selected coding style mode for every rasterline, in a corresponding rasterline-part header of a codestream created as a result of the compression coding.

10. An image processing apparatus comprising:

a compression coding unit to perform compression coding of image data according to JPEG2000 algorithm, wherein the compression coding unit performs the compression coding of the image data, including DC-level shifting processing, color transform processing, 2-dimensional discrete wavelet transform processing, quantization processing, coefficient bit modeling processing, arithmetic entropy coding processing, and data ordering control processing;

a coding style selection unit to selectively activate coding functions of the compression coding unit, wherein a coding style mode, specifying the selective activation of the coding functions of the compression coding unit by the coding style selection unit, is dynamically switched per a portion of the image data between different coding style modes, a coding efficiency unit to cause the compression coding unit to perform a plurality of coding style modes of compression coding processing of the image data in which the selective activation of the coding functions by the coding style selection unit differs each other, and to compute a coding efficiency of each of a set of code streams obtained through the different coding style processings respectively;

a selection unit to select one of the respective code streams with a highest coding efficiency among the computed coding efficiencies as being an output code stream actually outputted from the compression coding unit; and an image property discriminating unit to distinguish the characteristics of the image data and outputting a discriminating signal indicating the characteristics of the image data, wherein at least one of the compression coding unit, the coding style selection unit, and the image property discriminating unit are implemented with a processor;

wherein the DC-level shifting processing, the color transform processing, the 2-dimensional discrete wavelet transform processing, and the quantization processing, included in the compression coding, are subjected to the selective activation of the coding functions of the compression coding unit by the coding style selection unit in response to the discriminating signal.

11. An article of manufacture comprising one or more computer readable medium having instructions stored thereon which, when executed by a computer, cause the computer to execute an image processing method, the image processing method comprising:

performing compression coding of image data according to JPEG2000 algorithm, wherein the compression coding includes DC-level shifting processing, color transform processing, 2-dimensional discrete wavelet transform processing, quantization processing, a coefficient bit modeling processing, arithmetic entropy coding processing, and data ordering control processing;

selectively activating coding functions of the compression coding in response to a discriminating signal, so that the active coding functions of the compression coding are suited to characteristics of the image data, dynamically switching per a portion of the image data between different coding style modes, which specify the selective activation of the coding functions;

distinguishing the characteristics of the image data; and outputting a discriminating signal indicating the characteristics of the image data;

wherein the DC-level shifting processing, the color transform processing, the 2-dimensional discrete wavelet transform processing, and the quantization processing are subjected to the selective activation of the coding functions in response to the discriminating signal, wherein said selectively activating comprises:

activating the processing operations of DC-level shifting, color transform, 2-dimensional discrete wavelet transform and quantization in the compression coding unit when the discriminating signal indicates a natural image;

deactivating the processing operations of DC-level shifting, color transforming, 2-dimensional discrete wavelet transform and quantization in the compression coding unit when the discriminating signal indicates a palletized image or a bi-level image;

activating only the quantization processing optionally when the discriminating signal indicates a computer graphics image; and activating the processing operations of DC-level shifting, 2-dimensional discrete wavelet transform and quantization in the compression coding unit when the discriminating signal indicates a monochrome image.

12. An article of manufacture comprising one or more Computer readable medium having instructions stored thereon which, when executed by a computer, cause the computer to execute an image processing method, the image processing method comprising:

performing compression coding of image data according to JPEG2000 algorithm, wherein the compression coding includes DC-level shifting processing, color transform processing, 2-dimensional discrete wavelet transform processing, quantization processing, coefficient bit modeling processing, arithmetic entropy coding processing, and data ordering control processing;

selectively activating coding functions of the compression coding performing a plurality of coding style modes of compression coding processing of the image data in which the selective activation of the coding functions differs each other;

computing a coding efficiency of each of a set of code streams obtained through the different coding style processings respectively;

selecting one of the respective code streams with a highest coding efficiency among the computed coding efficiencies as being an output code stream created by the compression coding of the image data;

distinguishing the characteristics of the image data; and outputting a discriminating signal indicating the characteristics of the image data;

wherein the DC-level shifting processing, the color transform processing, the 2-dimensional discrete wavelet transform processing, and the quantization processing are subjected to the selective activation of the coding functions in response to the discriminating signal.

13. An image processing method comprising:

one or more processors implementing performing compression coding of image data according to JPEG2000 algorithm, wherein the compression coding includes DC-level shifting processing, color transform processing, 2-dimensional discrete wavelet transform processing, quantization processing, coefficient bit modeling processing, arithmetic entropy coding processing, and data ordering control processing;

selectively activating coding functions of the compression coding in response to a discriminating signal to cause the active coding functions of the compression coding to be suited to characteristics of the image data; dynamically switching per a portion of the image data between different coding style modes, which specify the selective activation of the coding functions;

distinguishing the characteristics of the image data; and outputting a discriminating signal indicating the characteristics of the image data;

wherein the DC-level shifting processing, the color transform processing, the 2-dimensional discrete wavelet transform processing, and the quantization processing are subjected to the selective activation of the coding functions by the coding style selection unit in response to the discriminating signal, and wherein the selectively activating coding functions comprises:

activating the processing operations of DC-level shifting, color transform, 2-dimensional discrete wavelet transform and quantization in the compression coding unit when the discriminating signal indicates a natural image;

deactivating the processing operations of DC-level shifting, color transforming, 2-dimensional discrete wavelet transform and quantization in the compression coding unit when the discriminating signal indicates a palletized image or a bi-level image;

activating only the quantization processing optionally when the discriminating signal indicates a computer graphics image; and activating the processing operations of DC-level shifting, 2-dimensional discrete wavelet transform and quantization in the compression coding unit when the discriminating signal indicates a monochrome image.

* * * * *